Patented Feb. 14, 1950

2,497,636

UNITED STATES PATENT OFFICE 2,497,636

PROCESS OF PREPARING DUST OF SLAKED LIME AND A HALOPHENOXYCARBOXYLATE WEED KILLER

Flaxney Percival Stowell, Buxton, England, assignor to Imperial Chemical Industries Limited, a corporation of Great Britain No Drawing. Application June 4, 1946, Serial No. 674,387. In Great Britain June 4, 1945

11 Claims. (Cl. 167—45)

This invention relates to improvements in the production of compositions suitable for agricultural and like purposes.

It has already been proposed to use certain aryloxyalkylcarboxylic acids and derivatives thereof for agricultural purposes, as for example in weed-killing operations. Thus, compounds containing the radical $C_6H_{4-n}X_nY.O.CHR.CO—$, in which X is hydrogen, methyl or halogen, Y is hydrogen, halogen or methyl, $n$ is an integer not greater than 2, and R is hydrogen or an alkyl radical, are known to be effective for such operations. For many purposes it is desirable or advantageous to apply a compound of this type simultaneously with hydrated lime or other solid materials, such as chalk or ground limestone, which are beneficial to the soil, and this can be conveniently carried out by employing a finely divided solid composition comprising the lime or other material and the active compound. In preparing such compositions, however, difficulties sometimes occur in the technical operation of producing the powder in the necessary dust-like form.

According to the present invention, a process for the production of a dust-like composition comprises slaking quick lime with an aqueous solution or dispersion of a compound containing the radical $C_6H_{4-n}X_nY.O.CHR.CO—$, in which X and Y may each be a hydrogen atom, a halogen atom or a methyl group, $n$ is an integer not greater than 2, and R is a hydrogen atom or an alkyl group, the amount of said solution or dispersion employed being such that the product is obtained in dry pulverulent form.

According to a modification of the invention, a process for the production of a dust-like composition comprises slaking quick lime with a mixture of said aqueous solution or dispersion and an aqueous slurry of a powdered diluent.

Various methods of slaking quick lime are known in which lime is treated with water in batches, or otherwise, so as to produce a dry powdered hydrated lime in a very fine state of subdivision which can be separated from any unburnt chalk or like impurities by sieving or air classification. In preparing products according to this invention similar methods of slaking may be employed using instead of water the aqueous solution or dispersion of active material. The active compounds are frequently produced as aqueous solutions or suspensions, and these may be used directly to slake the quick lime and thus produce the pulverulent product of this invention. Alternatively, they may be first diluted with water, so that a composition carrying a smaller amount of the organic compound may be obtained directly.

The active compounds which are employed for the process of this invention are compounds containing the radical $C_6H_{4-n}X_nY.O.CHR.CO—$, as defined above. Examples of such compounds are the phenoxyalkylcarboxylic acids and chloro- and chloromethylphenoxyalkylcarboxylic acids, such as the monochlorophenoxyacetic acids, 2,4-dichlorophenoxyacetic acid and 2-methyl-4-chlorophenoxyacetic acid, and salts and other derivatives of such acids. It is desirable to employ a solution of the active compound for slaking lime, rather than a dispersion, in view of the greater operational difficulties encountered in using the latter: hence compounds having at least an appreciable solubility in water are preferred. The sodium salts of the phenoxyalkylcarboxylic acids, such as sodium methylchlorophenoxyacetate, are particularly suitable.

In one form of the invention an aqueous solution of sodium 2-methyl-4-chlorophenoxyacetate, prepared by condensing the corresponding monochlorocresol with monochloroacetic acid in the presence of aqueous caustic soda, is applied to quick lime by spraying the solution onto crushed or granular quick lime, the amount of solution used being such that the product is a dry pulverulent solid. The powdered slaked material thus formed, carrying the sodium methylchlorophenoxyacetate, can be purified by sieving or air classification whereby any unhydrated material or other coarse impurities may be separated.

The concentration of the aqueous solution of active compound employed may be varied according to the proportion of active compound required in the final product, within the practical limits of the concentrations which are effective for slaking the lime. Thus slaking is effected satisfactorily with solutions containing up to 10%, or even more, of sodium methylchlorophenoxyacetate, for example. A 10% solution will give a hydrated lime composition containing approximately 5%, that is between 4.5% and 5.7%, by weight of sodium methylchlorophenoxyacetate. More dilute solutions may be employed if desired: for example, solutions containing approximately 1.6%, 5% and 7.5% of sodium methylchlorophenoxyacetate will give hydrated lime containing respectively 1%, 2.7% and 4% of the active compound. Thus to obtain these more dilute compositions the 10% solution of sodium methylchlorophenoxyacetate as normally produced may be diluted to the required concentration. Alternatively a more concentrated composition may be obtained and diluted subsequently by mixing it with further quantities of slaked lime, powdered chalk, ground limestone, sand, clay, dry earth, or other suitable powdered diluent, or a mixture of such diluents.

In a modified form of the invention, quick lime is slaked with a mixture of an aqueous solution or dispersion of the active compound and an aqueous slurry of a powdered diluent, such as one of those substances mentioned above. For example, a 10% aqueous solution of sodium 2-methyl-4-chlorophenoxyacetate may be mixed with a clay slurry, in any desired proportions according to the composition required for the final product, and this mixture may be employed for slaking the lime.

The slaking of quick lime is effected most readily by means of the more dilute solutions of the active compound. When using a 1% solution, for example, the lime is readily hydrated in the cold. However, with a 5% or stronger solution, in order to effect hydration within a reasonable length of time it is usually necessary to heat either the solution or the lime or both; for example a temperature of about 50° C. may be required to start the reaction readily with a 5% solution, and a temperature of 80° C. to 90° C. with a 10% solution. Any desired temperature up to the boiling point of the solution may be employed. Slaking can be effected with a 14% solution of sodium 2-methyl-4-chlorophenoxyacetate, by employing the solution practically at boiling point and by first heating the lime. An alternative method of initiating the hydration consists in first adding water to the lime: when the temperature of the lime has risen to the required extent, as a result of the heat evolved in the hydration, the reaction can then be continued by adding the cold solution. In general the most convenient method of starting the hydration consists in adding hot solution, if desired slightly diluted, to the lime or to a portion of the lime; then as soon as the reaction has started it can be continued by adding the cold solution of the required concentration. The temperature of the hot liquor and the length of time for which contact of the hot liquor with the lime is needed to initiate the reaction are interdependent, as well as being dependent upon the concentration of the liquor, and are subject to variations according to the quality of the lime used and working conditions in general. It is possible to start the reaction in the cold, even with a 10% solution, by leaving the solution in contact with the lime for a considerable time. However, this method is uneconomic and it is therefore preferred to start the reaction with a hot solution.

As stated above, the amount of the solution or dispersion of the active compound employed must be such that the product is obtained in dry pulverulent form. If desired, the amount of liquor may be insufficient to hydrate the whole of the lime. In this case, the product must be subjected to sieving or air classification to remove the unhydrated material. Preferably, however, sufficient liquor is used to hydrate the lime completely. In practice it is necessary to use a considerable excess of the solution, to compensate for the water lost by evaporation as a result of the heat evolved in the reaction. For example, up to 100% excess of a 10% solution of sodium methylchlorophenoxyacetate may be required. The actual amount employed is determined in operation by the appearance of the product: thus, if the product leaving the hydration plant is seen to contain a significant proportion of granular unhydrated material, the rate of addition of liquor to the lime is increased, while if the product is not sufficiently dry the rate of addition of liquor is decreased.

The process of the present invention may be carried out in a hydration plant of the type generally used for the hydration of lime, and is readily adapted to continuous operation. In a preferred method of carrying out the process, the materials employed are crushed quick lime and 10% sodium 2-methyl-4-chlorophenoxyacetate liquor. A portion of the lime is introduced into the hydrator, and a quantity of the liquor, if desired diluted to 8% concentration, is heated to between 80° C. and 90° C. and is added to the lime. When the reaction has begun, which usually requires from 2 to 10 minutes, the lime and cold 10% liquor feeds, which enter the hydrator adjacent to one another, are started. The liquor feed line may be jacketed, and at the beginning of the run steam is passed through the jacket to heat the liquor entering the hydrator. Alternatively the liquor feed line may be heated by electrical or any other suitable means. This heating is continued until the input end of the hydrator has attained a sufficiently high temperature for the reaction to proceed rapidly. The steam supply is then shut off, and the cold liquor is fed into the hydrator for the remainder of the run. It is not necessary to measure directly the feed rates of either the lime or the liquor, but these are so regulated that the lime is completely hydrated during its passage through the hydrator and the product leaving the hydrator is in the required dry, pulverulent form, and contains approximately 5% by weight of sodium 2-methyl-4-chlorophenoxyacetate. If necessary, the product may be purified by sieving or air classification.

The following examples illustrate but do not limit the invention, all parts and proportions being by weight.

*Example 1*

The process was carried out in a continuous manner in a Kritzer hydrator, to which crushed quick lime and 10% sodium 2-methyl-4-chlorophenoxyacetate liquor were supplied through feed lines entering the hydrator at adjacent points.

At the commencement of the run, 70 lbs. of lime were introduced into the feed end of the hydrator, and 68 lbs. of the 10% liquor at a temperature of 90° C. were run on to the lime. After 10 minutes, reaction had begun, and the hydrator was started up, lime and liquor being fed in continuously. The liquor feed line was steam jacketed for 30 minutes; at the end of this time the steam was shut off and the feed was continued with the cold liquor. The lime and liquor feed rates were adjusted so that the lime passed through the hydrator in approximately 30 minutes and emerged therefrom in a substantially completely hydrated condition and in the form of a dry powder. Any remaining granules of unhydrated lime, together with coarse impurities, were subsequently removed by sieving.

The product thus obtained contained a proportion of sodium 2-methyl-4-chlorophenoxyacetate varying between 4.5% and 5.5%, and the average efficiency of the process was 95%.

*Example 2*

70 parts of a clay slurry in water in which the water/solids ratio was 1:1 were mixed with 12.5 parts of a 10% aqueous solution of sodium-2-methyl-4-chlorophenoxyacetate. The mixture was heated, and was added to 56 parts of crushed quick lime. Reaction proceeded smoothly, and the product was a fine pale yellow powder containing 1.01% of sodium 2-methyl-4-chlorophenoxyacetate.

I claim:

1. A process for the production of a dust-like herbicidal composition comprising a chlorophenoxyacetate from an aqueous solution of said herbicidally active acetate which comprises treating quick lime in a lime hydrator with a 10% aqueous solution of sodium 2-methyl-4-chlorophenoxyacetate at a temperature between 80° C. and 90° C. for between 2 and 10 minutes, then feeding quick lime and the said solution continuously into the hydrator, the solution being heated for the first 30 minutes, and the feed rates of the lime and of the solution being regulated so that the product emerges from the hydrator in a substantially completely hydrated condition and in dry pulverulent form, and subjecting the product to a purification treatment whereby granular impurities are removed.

2. A process for the production of dust-like herbicidal compositions comprising a halophenoxycarboxylate which comprises slaking quick lime with water having admixed therewith a compound containing the radical

in which X and Y may be each selected from the group consisting of hydrogen, halogen and methyl, $n$ is an integer not greater than 2 and R is a member of a group consisting of hydrogen and alkyl, the concentration of said compound in said water mixture being between 1 and 14% weight/volume and the amount of solution employed being such that the product is obtained in dry pulverulent form.

3. A process as set forth in claim 2 wherein the compound used to slake the quick lime is in the form of an aqueous dispersion.

4. A process as set forth in claim 2 wherein the product is purified by classification treatment to remove granular unhydrated material and coarse impurities.

5. A process as set forth in claim 2 wherein the slaking is initiated at an elevated temperature up to the boiling point of the solution employed.

6. A process as set forth in claim 2 wherein the water mixture used to slake the quick lime is diluted with an aqueous slurry of a powdered diluent.

7. A process as set forth in claim 2 wherein the slaking is initiated at a temperature between 80° and 90° C.

8. A process as set forth in claim 2 wherein the product is mixed with a powdered diluent.

9. A process for the production of dust-like herbicidal compositions comprising a halophenoxycarboxylate which comprises slaking quick lime with water having admixed therewith a halophenoxycarboxylate compound containing a radical selected from the group consisting of monochlorophenoxyacetic, 2,4-dichlorophenoxyacetic, and 2-methyl-4-chlorophenoxyacetic radicals, the concentration of said compound in said water mixture being between 1% and 14% weight/volume and the amount of solution employed being such that the product is obtained in dry pulverulent form.

10. A process for the production of a dust-like herbicidal composition comprising a chlorophenoxyacetate which comprises slaking quick lime with an aqueous solution of sodium 2-methyl-4-chlorophenoxyacetate, the concentration of said chlorophenoxyacetate in said aqueous solution being between 1% and 14% weight/volume and the amount of said solution employed being such that the resulting product is obtained in dry pulverulent form.

11. A process for the production of a dust-like herbicidal composition comprising a chlorophenoxyacetate which comprises slaking quick lime with an aqueous 10% weight/volume solution of sodium 2 - methyl - chlorophenoxyacetate, the amount of said solution employed being such that the resulting product is obtained in dry pulverulent form.

FLAXNEY PERCIVAL STOWELL.

REFERENCES CITED

The following references are of record in the file of this patent:

UNITED STATES PATENTS

| Number | Name | Date |
|---|---|---|
| 1,195,140 | Keck | Aug. 15, 1916 |
| 2,193,391 | Carson | Mar. 12, 1940 |
| 2,282,732 | Lean et al. | May 12, 1942 |
| 2,309,168 | Corson | Jan. 26, 1943 |
| 2,356,760 | Garvin | Aug. 29, 1944 |
| 2,390,941 | Jones | Dec. 11, 1945 |

OTHER REFERENCES

"Present Status of Plant Hormones," P. W. Zimmerman, Industrial and Engineering Chemistry, May 1943, vol. 35, No. 5, pages 596–601.